(12) United States Patent
Lee et al.

(10) Patent No.: US 7,032,172 B1
(45) Date of Patent: Apr. 18, 2006

(54) SYSTEM AND METHOD FOR DISPLAYING SCALE-DOWN PICTURE

(75) Inventors: Hwa Kyung Lee, Seoul (KR); Sun Hee Wee, Seoul (KR); Shi Hyong Cho, Seongnam (KR); Hee Jeong Choo, Seoul (KR); Sang Youl Lee, Seongnam (KR); Ki Young Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/357,985

(22) Filed: Jul. 21, 1999

(30) Foreign Application Priority Data

Jul. 21, 1998 (KR) .............................. 1998-29286
Aug. 27, 1998 (KR) .............................. 1998-34876

(51) Int. Cl.
*G06F 17/00* (2006.01)

(52) U.S. Cl. ...................... 715/526; 715/517; 715/513

(58) Field of Classification Search ................ 707/526, 707/527, 513; 345/127, 763; 715/526, 527, 715/513, 501.1, 763, 517
See application file for complete search history.

(56) References Cited

U.S. PATENT DOCUMENTS

| 4,715,059 A | | 12/1987 | Cooper-Hart et al. ......... 379/53 |
| 5,572,643 A | | 11/1996 | Judson ....................... 395/793 |
| 5,634,018 A | * | 5/1997 | Tanikoshi et al. ........... 345/751 |
| 5,640,579 A | * | 6/1997 | Koppolu et al. ............ 345/781 |
| 5,784,058 A | | 7/1998 | LaStrange et al. .......... 345/340 |
| 5,819,301 A | * | 10/1998 | Rowe et al. ................. 715/513 |
| 5,933,843 A | * | 8/1999 | Takai ........................ 707/526 |
| 5,963,964 A | * | 10/1999 | Nielsen .................... 715/501.1 |
| 6,008,809 A | * | 12/1999 | Brooks ....................... 345/792 |
| 6,023,714 A | * | 2/2000 | Hill et al. ................... 345/760 |
| 6,031,989 A | * | 2/2000 | Cordell ....................... 717/109 |
| 6,067,070 A | * | 5/2000 | Suzuki et al. ............... 345/660 |
| 6,069,606 A | * | 5/2000 | Sciammarella et al. ..... 345/660 |
| 6,072,598 A | * | 6/2000 | Tso .......................... 358/442 |
| 6,133,913 A | * | 10/2000 | White et al. ................ 345/719 |
| 6,133,916 A | * | 10/2000 | Bukszar et al. ............. 345/744 |
| 6,182,072 B1 | * | 1/2001 | Leak et al. .................. 707/10 |
| 6,182,090 B1 | * | 1/2001 | Peairs ....................... 715/500 |
| 6,209,009 B1 | * | 3/2001 | Schwartz et al. ........... 707/517 |
| 6,266,684 B1 | * | 7/2001 | Kraus et al. ................ 715/513 |
| 6,326,970 B1 | * | 12/2001 | Mott et al. .................. 345/667 |
| 6,389,437 B1 | * | 5/2002 | Stoub ........................ 345/760 |

(Continued)

FOREIGN PATENT DOCUMENTS

JP        10124518        5/1998

OTHER PUBLICATIONS

Schmid, Stefan, "A new Dimension of Web Representation", Jun. 1998, pp. 1-2, [http://www.comp.lcs.ac.uk/computing/users/sschmid/Yuforic/node2.html].*

(Continued)

*Primary Examiner*—Sanjiv Shah
(74) *Attorney, Agent, or Firm*—Sughrue Mion, PLLC

(57) ABSTRACT

A web document display system and method wherein the web document display system includes a web document retriever for retrieving a web document via a network, a main display for displaying the retrieved web document thereon, a scale-down picture generator for generating a scale-down picture obtained by scaling down the web document not more than a predetermined size, and a sub-display for displaying the scale-down picture. Accordingly, the entire configuration of the web document can be seen on a screen.

21 Claims, 7 Drawing Sheets

U.S. PATENT DOCUMENTS

| | | | |
|---|---|---|---|
| 6,421,070 B1 * | 7/2002 | Ramos et al. | 345/763 |
| 6,457,026 B1 * | 9/2002 | Graham et al. | 715/512 |
| 6,526,424 B1 * | 2/2003 | Kanno et al. | 715/512 |

OTHER PUBLICATIONS

Schmid, Stefan, "Web Page Rendering and Image processing", Jun. 1998, pp. 1-2, [http://www.comp.lcs.ac.uk/computing/users/sschmid/Yuforic/node7.html].*

Schmid, Stefan, "Static vs Dynamic Thumbnails", Jun. 1998, pp. 1-2, [http://www.comp.lcs.ac.uk/computing/users/sschmid/Yuforic/node3.html].*

"Focus Highlight for World Wide Web", Nov. 1997, IBM Technical Disclosure Bulletin, vol. 40, No. 11, pp. 89-90.*

U.S. Appl. No. 60/046,730.*

U.S. Appl. No. 60/046,749.*

* cited by examiner

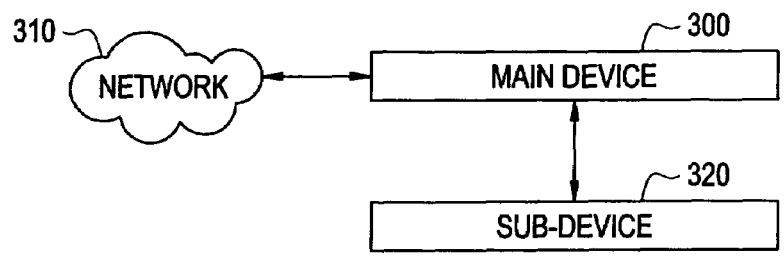
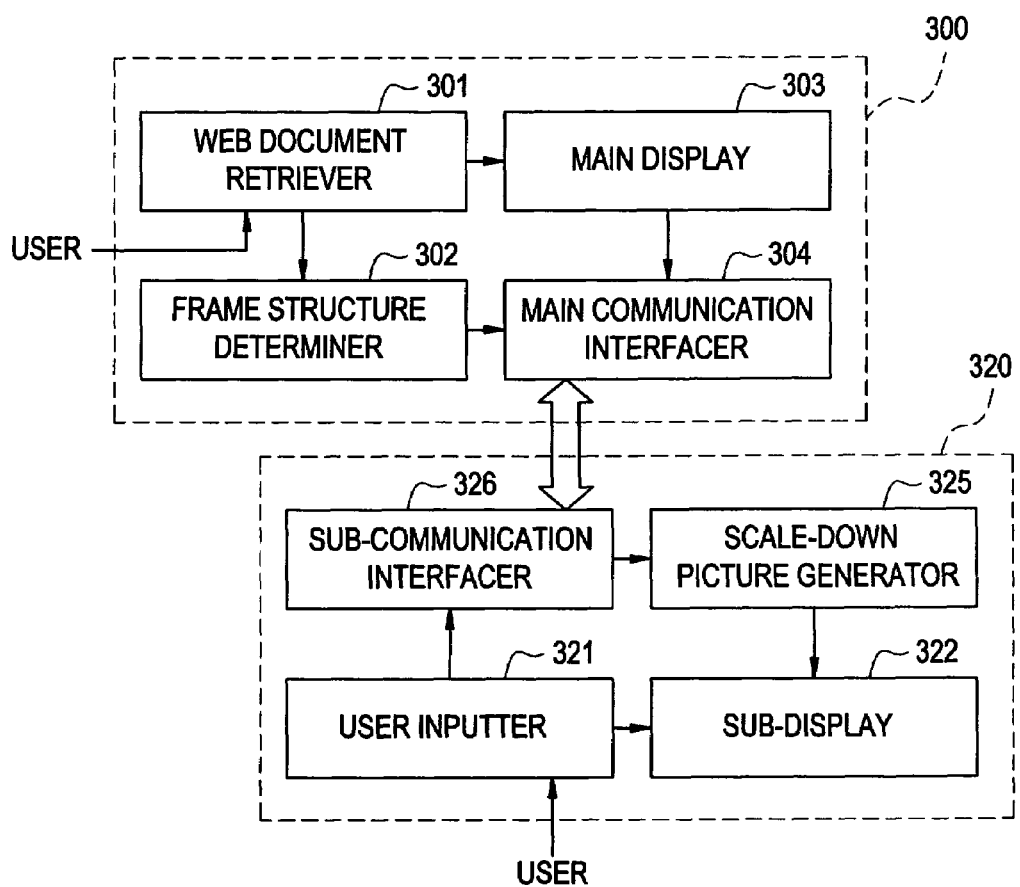

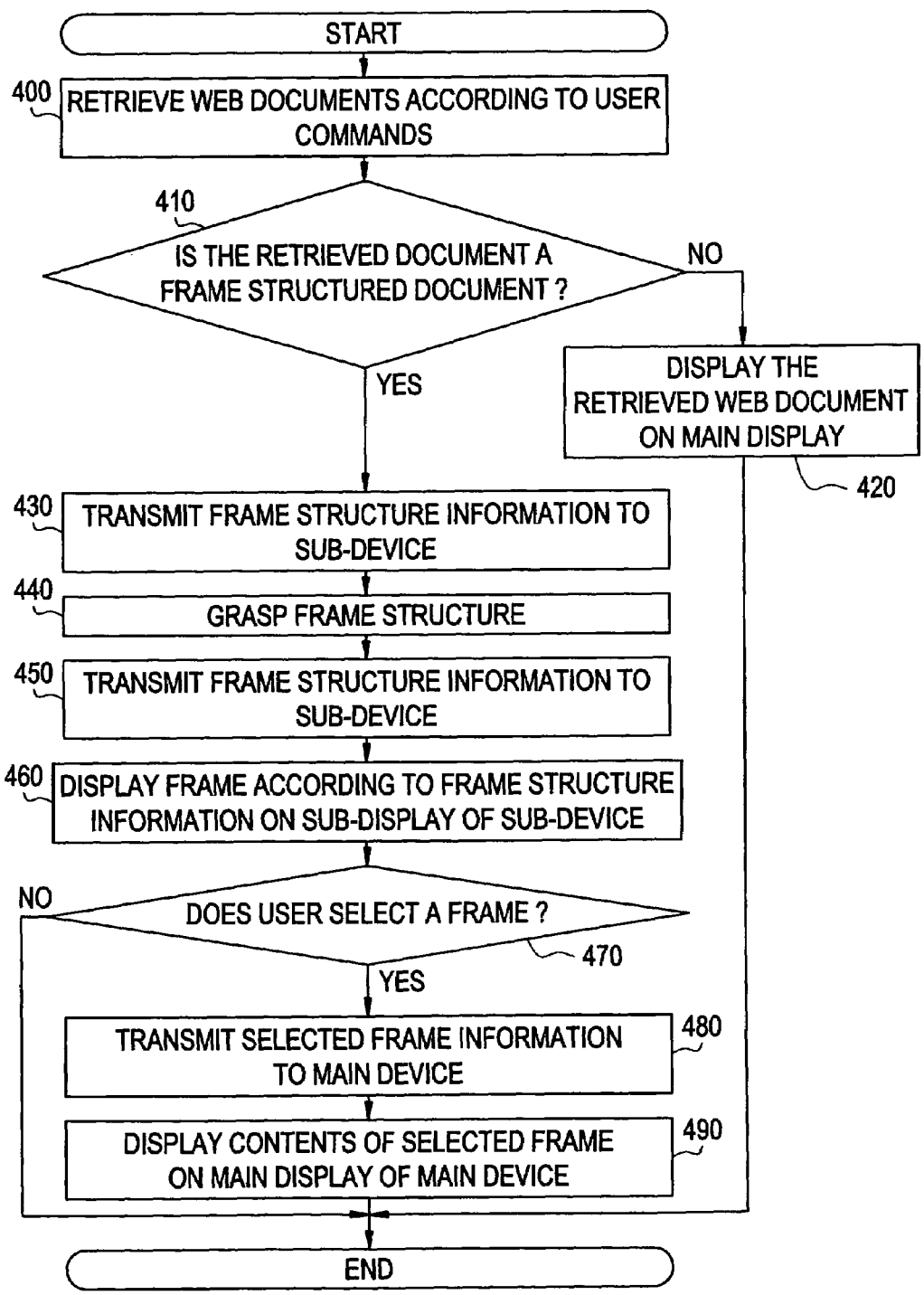

SYSTEM AND METHOD FOR DISPLAYING SCALE-DOWN PICTURE

BACKGROUND OF THE INVENTION

1. Technical Field

The present invention relates to a system for displaying web documents and a method therefor, and more particularly, to a system for displaying web documents so that users can grasp the entire configuration of a web page and a method therefor.

2. Prior Art

The World-Wide Web (WWW), which will be referred to as the "Web" hereinafter, is the most popular information provider on the Internet. The Web allows information to be provided and exchanged in the forms of graphics and sound as well as text.

As use of the Web grows, a function accessible to the Web (hereinafter referred to as "Web accessible function") is adopted in not only portable equipment, such as a laptop computer, a notebook computer, a mobile phone and PDAs/PCAs (Personal Digital/Communication Assistants), it also is adopted in desktop computers, as well as home appliances having a display function such as a digital TV or an internet TV.

One of the most significant features of the Web resides in providing information in the form of "hypertext" or "hypermedia". The term "hypertext" indicates text information that includes "links" to other on-line information therein. The term "hypermedia" indicates information that includes "links" to information in several forms, such as images, sounds, and even motion images, as well as simple characters. To receive desired information, a user clicks one of the "links" that is embedded in the text of a document displayed on the screen. This will enable the user to receive a new document in a desired web site specified by a URL (Universal Resource Locator).

The web documents which can be accessed via the Web are written into Hypertext Markup Language (HTML), which provides a basic document format and allows links to other servers or files to be specified. A "tag" is used as a command, which is inserted in the middle of a text in order to display the text on a screen or to link to other web documents.

A basic pattern of the tag is <TAG>~</TAG>, in which <TAG> means the start of a HTML command, a main text influenced by the tag is arranged in the "~" portion, and </TAG> means the end of the HTML command. The basic configurations of HTML tags are <HTML>~</HTML>, <HEAD>~</HEAD>, and <BODY>~</BODY>. Here, <HTML> declares that the document is made up in the form of HTML, <HEAD> means that information defining the written time and size of the document is loaded, and <BODY> means the main text of the document.

The HTML document requested by a web browser is provided to the web browser by a web server. The web browser analyzes a tag inserted in the provided document, and displays the document in an appropriate manner based on the analyzed result.

Meanwhile, in the case that the displayed web document is a HTML document of frame structure which is displayed as several divided screens, each called a "frame", via a web browser, a <frame> or <frameset> tag is used to indicate that a frame structure is included therein. The web browser grasps the frame structure of the HTML document via the frame tag.

FIG. 1a shows a conventional web document displayed on a screen according to a prior art display method. Here, if a web page 190 is beyond the size of the screen, a scroll bar 191 is provided to allow users to scroll the remaining portions.

FIG. 1b shows web documents of frame structure displayed on a screen according to a conventional display method. Four frame-structured documents 100, 110, 120 and 130 are displayed on a screen. Also, if the dimension of the document is beyond the frame size, respective scroll bars 101, 111, 121 and 131 are provided for the documents. A user manipulates each scroll bar 101, 111, 121 or 131 so as to see the remaining portions which are beyond the screen.

FIG. 1c shows HTML documents of frame structure displayed on a screen according to a conventional display method. Here, frames 140, 150, 160 and 170 are arranged vertically, and a scroll bar 180 is provided to permit a user to scroll the content or frame which has not been displayed on the screen.

According to the display method shown in FIG. 1a, all of the remaining portions that are not currently displayed cannot be seen at a time. The user can see the entire configuration of the web page only by scrolling the whole web page with a scroll bar.

According to the frame-structured web document display method shown in FIG. 1b, all frames are displayed on a single screen. Thus, if the size of a display screen is so small as in a web video phone and a mobile phone adopting a web accessing function, it is not so easy to see the entire content of the document on the screen. Also, the configuration of the screen is complicated.

According to the method shown in FIG. 1c, the user has a difficulty in grasping the entire structure of the document. As a result, the user cannot select a desired frame quickly. Also, a shift between frames is slow.

SUMMARY OF THE INVENTION

It is thus an object of the present invention to provide a system and a method for displaying a web document so that the entire web document can be seen on a screen.

It is another object of the present invention to provide a system and a method for displaying a web document of a frame structure so that a user can see a desired frame quickly and easily.

One object of the present invention can be accomplished by providing a web document display system, comprising: a web document retriever for retrieving a web document via a network; a main display for displaying the retrieved web document thereon; a scale-down picture generator for generating a scale-down picture obtained by scaling down the web document to not more than a predetermined size; and a sub-display for displaying the scale-down picture.

Here, the present invention further comprises a frame structure determiner for grasping the frame structure of the retrieved web document. It is preferable that the frame structure of the web document is indicated on the scale-down picture.

Meanwhile the sub-display is preferably composed of a scale-down picture window which is formed on a portion of the main display.

Also, the present invention further comprises a scale-down picture selector for selecting a display or a non-display of the scale-down picture window. The sub-display is preferably in a non-display mode if a predetermined time elapses after the scale-down picture window is displayed.

The present invention further comprises: a main device including the web document retriever and the main display attached thereto, and the frame structure determiner for grasping the frame structure of the retrieved web document; a sub-device including the scale-down picture generator and the sub-display attached thereto, and a user input device; and a communicator for allowing the main device and the sub-device to communicate with each other, thereby providing information about the frame structure grasped by the frame structure determiner to the sub-device and transferring the frame select information inputted through the user input device to the main device. In the invention, the sub-display displays the frame structure as provided, to thereby allow the user to select the frame through the user input device. For this purpose, it is more effective that the main display displays the selected frame according to the frame select information.

In accordance with the present invention, the communicator is preferably a wire-based or wireless communicator. The sub-display is preferably controlled so as to emphasize and display the frame selected by the user input device.

Meanwhile, when a plurality of frames are selected via the user input device, it is preferable that the main display sequentially displays the selected frames at a predetermined interval of time.

The other object of the present invention can be accomplished by providing a web document display method, comprising the steps of: displaying a web document retrieved via a network; generating a scale-down picture obtained by scaling down the web document not more than a predetermined size; and displaying the scale-down picture. Here, the scale-down picture is preferably indicated as a window, which occupies a part of the screen on which the web document is displayed. Also, the present invention further comprises the step of selecting a display or a non-display of the scale-down picture window.

The present invention further comprises the step of performing a non-display of the scale-down picture if a predetermined time elapses after the scale-down picture window is displayed.

Here, the scale-down picture generating step comprises the steps of storing the web document; grasping the frame structure of the web document; and generating the frame structure into the scale-down picture, in which the retrieved web document is displayed on a predetermined location of the main display.

The scale-down picture displaying step comprises the steps of: transferring the scale-down picture to a remotely located sub-display; and displaying the scale-down picture on the sub-display.

Also, it is preferable that the present invention further comprises the steps of selecting at least one frame from the scale-down pictures, and displaying the selected frame on the main display.

BRIEF DESCRIPTION OF THE DRAWINGS

The above objects of the present invention will become more apparent by describing in detail the preferred embodiments of the present invention with reference to the attached drawings in which:

FIG. 2 is a block diagram of a system for displaying a web document of frame structure according to the present invention;

FIG. 3 is a detailed block diagram of FIG. 2;

FIG. 4 is a flow-chart view showing a method for displaying a web document of frame structure according to the present invention;

DETAILED DESCRIPTION OF THE PREFERRED EMBODIMENT

Figure 1A:
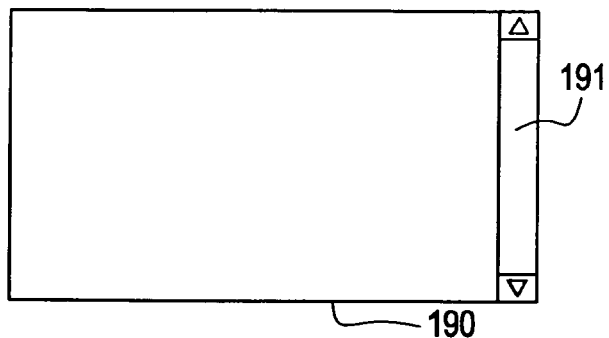
FIG. 1a shows a conventional web document displayed on a screen according to a prior art display method.
Figure 1B:
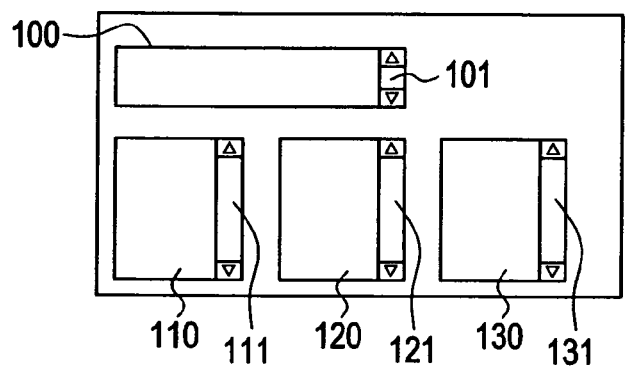
FIG. 1b shows an example of web documents of frame structure displayed on a screen according to a conventional display method.
Figure 1C:
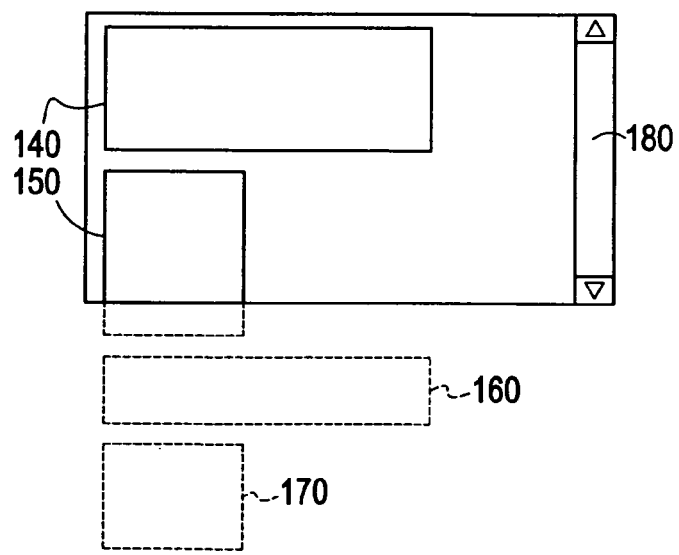
FIG. 1c shows another example of web documents of frame structure displayed on a screen according to a conventional display method.

The preferred embodiments will be described in detail with reference to the accompanying drawings.

FIG. 2 is a block diagram of a web document display system according to a first embodiment of the present invention.

In the first embodiment, the web document display system includes a network 310 for rendering a connection between a plurality of computers or servers, a main device 300 for retrieving web documents via the network 310 and displaying the retrieved result thereon, and a sub-device 320 for displaying information about the web document frame structure received from the main device. Here, the main device 300 and the sub-device 320 are individual apparatuses, which include their own communication interfaces, and thus, they perform transmission and reception of information via a wire communication or a wireless communication, such as a RF communication.

In FIG. 2, the network 310 includes the Internet for retrieving web documents, and the main device 300 can be connected to the network 310, as in home appliances having a display function, such as a digital TV or an internet TV, as well as portable equipment such as a desktop computer, a laptop computer, a notebook computer, a mobile phone, a web video phone and PDAs/PCAs (Personal Digital/Communication Assistants). Meanwhile, the sub-device 320 is a remote control device having a function of displaying received data, which can perform transmission and reception of data via a wire or wireless communication with the main device 300.

FIG. 3 is a detailed block diagram of FIG. 2. In FIG. 3, the main device 300 includes a web document retriever 301 for retrieving a web document via a network 310 based on the command received from a user, a main display 303 for displaying the retrieved web document thereon, a frame structure determiner 302 for judging whether the retrieved web document has a frame structure, and for grasping the frame structure if a corresponding document has a frame structure, and a main communication interfacer 304 for communicating with the sub-device 320.

The sub-device 320 includes a user inputter 321 for allowing a user to input a frame select command or a web document retrieving command, a scale-down picture generator 325 for generating a scale-down picture to indicate a frame structure, using frame structure information received from the frame structure determiner 302 via a user communication interface 326, and a sub-display 322 for displaying the scale-down picture received from the scale-down picture generator 325.

Here, the main display 303 and the sub-display 322, respectively, include controllers for controlling transmission and reception of data.

FIG. 4 is a flow-chart view showing a display method for displaying a web document of a frame structure according to the present invention.

The web document retriever 301 receives from a user a retrieving command to retrieve a web document, receives data from the network 310, and fetches a retrieved web document (step 400). The user directly inputs the command for retrieval via an input device provided in the web document retriever 301. Otherwise, the user can input a retrieving command via an input device provided in a user inputter 321 of the sub-device 320 when the sub-device 320 is remote from the main device 300. In this case, the user retrieving command is transmitted to the web document retriever 301 of the main device 300 via an input command transceiver (not shown). The user inputter 321 can be implemented using various patterns such as a mouse, a track ball, a touch screen or a user button panel, with which the user can click a select panel displayed on the screen of the sub-display 322.

The web document is made up of the HTML, including a command called a "tag". Thus, the frame structure determiner 302 judges whether or not a corresponding web document has a frame structure or not, according to the judgment as to whether or not a frame tag declaring the frame structure is inserted into the web document (step 410).

If the retrieved web document is not a frame structured document, the web document is displayed on the main display 303 without any modification, as it is (step 420). However, if the retrieved web document is a frame structured document, the main display 303 displays only the first frame in the retrieved web document (step 430). Here, a sequence of frames is determined according to the sequence of frame tags. In this case, the user can select a frame to be displayed initially by setting an initial value.

The frame structure determiner 302 grasps the frame structure via the inserted tag (step 440). Then, the frame structure determiner 302 transmits the frame structure information to the sub-display 322 via the main communication interfacer 304 (step 450). The sub-display 322, having received the frame structure, information arranges all the frames at a predetermined ratio on a self-contained screen and displays the arranged frames (step 460). In this case, the sub-display 322 displays the frames displayed on the main display 303 of the main device 300 with an emphasis among the entire frames displayed on the screen of the sub-display 322, using a highlight or motion image icon, to discriminate them from the remainders. The user identifies the frame structures of the web documents displayed on the sub-display 322 of the sub-device 320, and on this basis, the user selects a desired frame via the user inputter 321 (step 470). Here, if the user selects a desired frame, the sub-display 322 informs the user of which frame has been selected by placing a highlight mark on a corresponding frame or using a motion image icon.

Meanwhile, the sub-communication interfacer, that is, the user communication interfacer 326 transmits the frame information selected by the user to the main display 303 of the main device 300 (step 480). The main display 303, having received the user's selected frame information, updates and displays the corresponding frame on the screen (step 490). Here, the user can select a plurality of frames. When a plurality of frames have been selected, the main display 303 sequentially displays the selected frames at a predetermined interval of time on the screen.

Figure 5A:
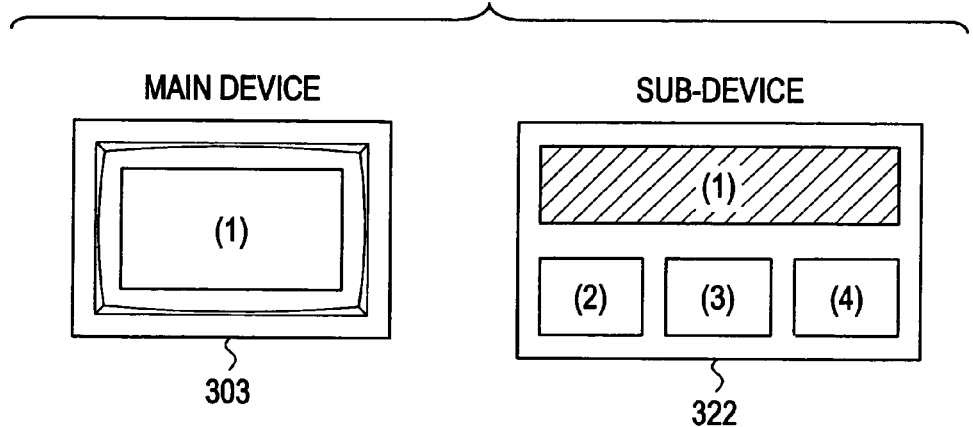
FIG. 5a is a schematic view illustrating the states of web documents displayed on a main device 300 and a sub-device 320, respectively, while performing step 460 of FIG. 4.

FIG. 5*a* is a schematic view illustrating the states of the web documents displayed on a main device 300 and a sub-device 320, while performing step 460 of FIG. 4.

On the main display 303 of the main device 300, the first frame of the web document retrieved by the web document retriever 301 is displayed. On the sub-display 322 of the sub-device 320, all the frames of the web document are arranged at a predetermined ratio on a single screen. Here, the frame number is determined according to the sequence of the frame tags entered in the web document. Since the first frame is displayed on the main display 303 of the main device 300, the sub-display 322 of the sub-device 320 emphasizes the corresponding frame, to allow the user to easily see which frame has been displayed on the main display of the main device.

Figure 5B:
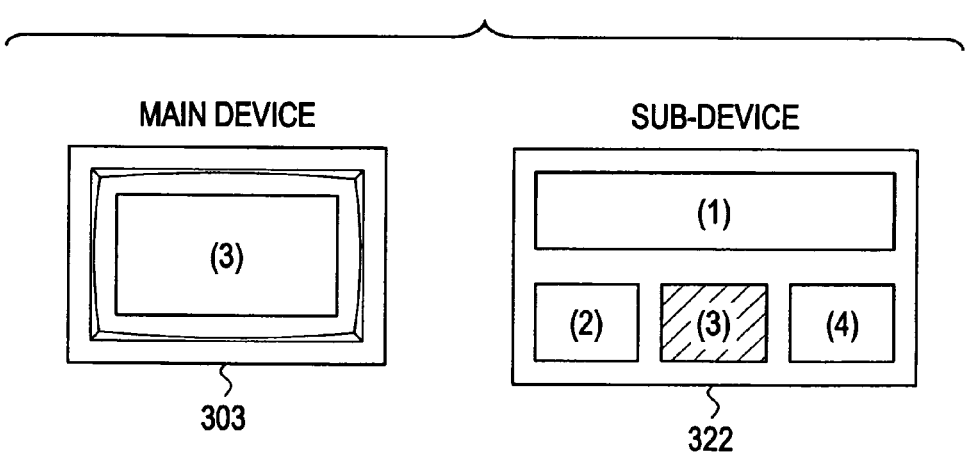
FIG. 5b is a schematic view illustrating the states of web documents displayed on a main device 300 and a sub-device 320, respectively, while performing step 490 of FIG. 4.

FIG. 5*b* is a schematic view illustrating the states of web documents displayed by a main device 300 and a sub-device 320, while performing step 490 of FIG. 4.

On the main display 303 of the main device 300, a frame selected by the user is displayed. On the sub-display 322 of the sub-device 320, all the frames of the web document are arranged at a predetermined ratio on a single screen. Since the third frame is displayed on the main display 303 of the main device 300, the sub-display 322 of the sub-device 320 emphasizes the corresponding frame, highlighted to allow the user to easily see which frame has been displayed on the main display of the main device.

Figure 6:
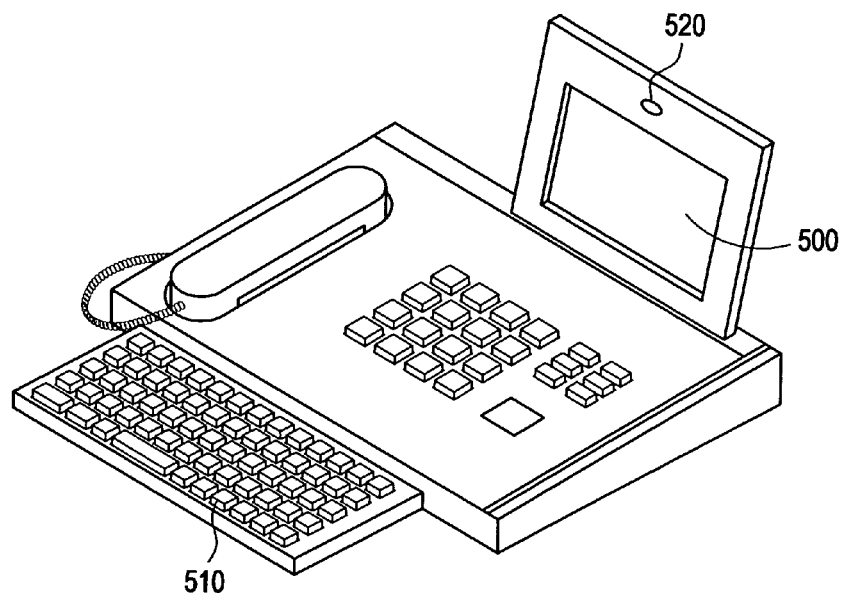
FIG. 6 is a perspective view of a web video phone, as one exemplary embodiment according to the present invention.
Figure 7:
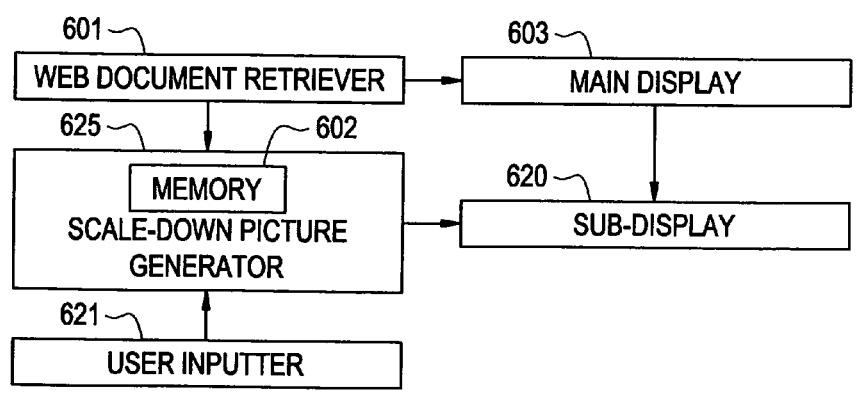
FIG. 7 is a block diagram of a web document display apparatus embodied in the web video phone of FIG. 6.

FIG. 6 is a perspective view of a web video phone according to a second embodiment of the present invention. FIG. 7 is a block diagram of a web document display apparatus implemented in the web video phone of FIG. 6.

A web video phone is an information terminal with which a color liquid crystal display screen 500, a key board 510, a card reader (not shown), a CCD (charge coupled device) camera 520, etc. are equipped. The web video phone allows users to utilize international calls or video calls at a low cost via a general public telecommunication network or the Internet.

In the web video phone which is the second embodiment of the web document display system according to the present invention, a main device and a sub-device are not separate individual devices but are incorporated into a single apparatus. In detail, the web video phone includes a web document retriever 601 for retrieving a web document via a network based on a user command, a main display 603 for displaying the retrieved web document, a user inputter 621 provided in a position of the web video phone, which includes an entire screen scale-down key for displaying a scale-down picture of the entire web document or non-displaying the scale-down picture, a scale-down picture generator 625 for generating a scale-down picture of the retrieved web document, and a sub-display 620 for displaying the scale-down picture received from the scale-down picture generator 625. Here, the sub-display 620 includes a scale-down picture window formed on a portion of the main display 603. A memory 602 for storing web documents therein is included in the scale-down picture generator 625.

Figure 8:
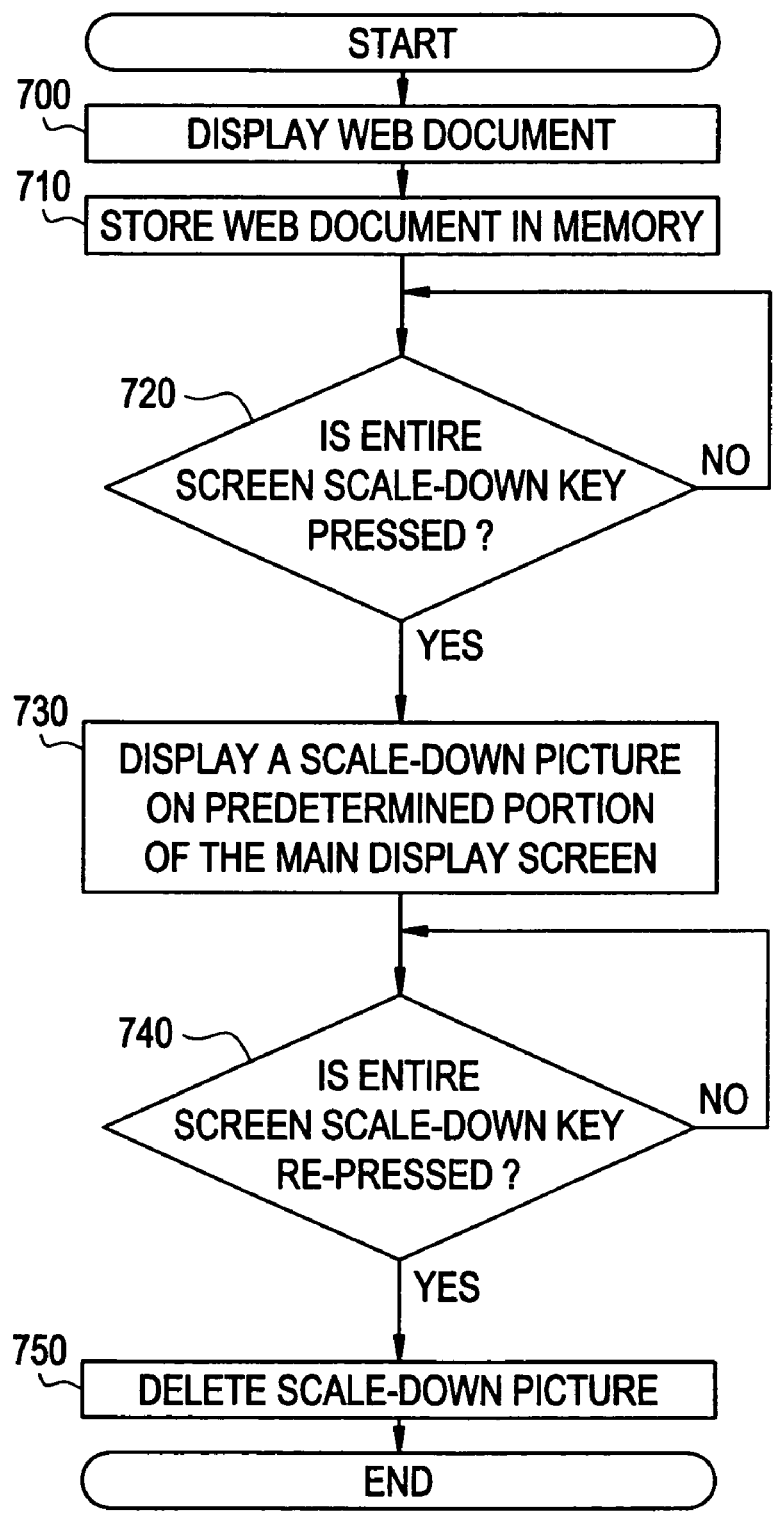
FIG. 8 is a flow-chart view showing a method for displaying a web document on a web video phone, as one exemplary embodiment according to the present invention.

FIG. 8 is a flow-chart view showing a method for displaying a web document of the web video phone according to the present invention.

First, as the web document retriever 601 retrieves web documents via a network such as the Internet according to a user command, the main display 603 displays the web document received from the web document retriever 601 (step 700) and the scale-down picture generator 625 stores the retrieved web document in the memory 602 (step 710).

Meanwhile, if the user presses an entire screen scale-down key (step 720), the web document stored in the memory 602 is scale-downed and the scale-downed web document is displayed on a scale-down picture window formed on a position of the screen of the main display 603 (step 730).

The entire screen scale-down key is a button on a control panel in a conventional web video phone, which is provided in a predetermined position. As a user presses the entire screen scale-down key, the entire web document is scale-downed and displayed on a scale-down picture window. Accordingly, the user can see the entire web document, although it is beyond the screen of the main display 603.

Meanwhile, although a user does not press the entire screen scale-down key, a web document is displayed on the screen of the main display 603 and at the same time the scale-down picture is displayed. Otherwise, if the web document is of frame structure, the scale-down picture generator 625 can generate a scale-down picture of the screen on which the entire frame structure is displayed, so that frame structure information can be seen.

Figure 9:
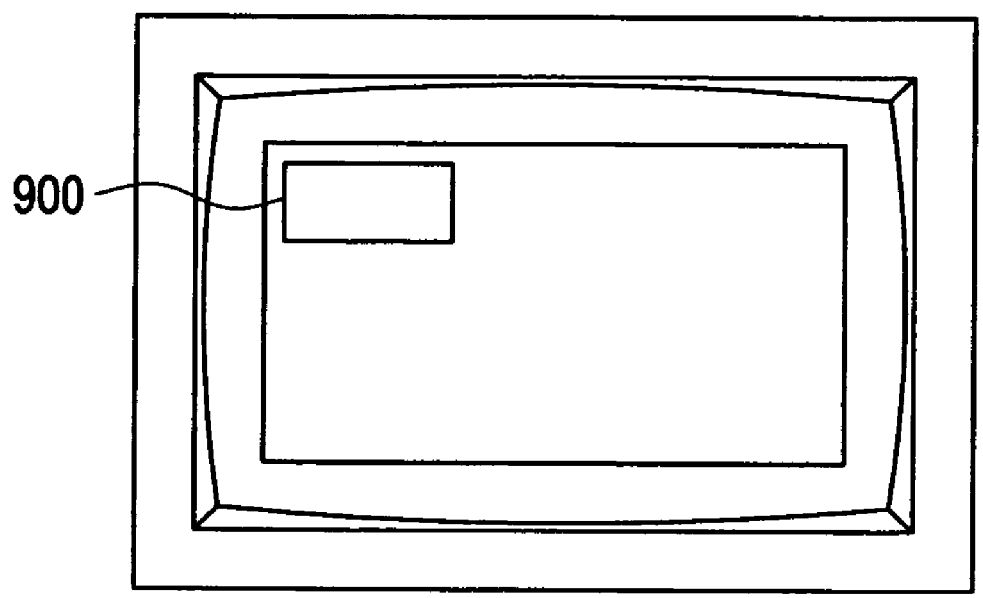
FIG. 9 shows a screen on which a scale-down picture of a web document having a frame structure is displayed.

FIG. 9 shows a main display screen on which a scale-down picture window 900 of a web document is displayed. Here, a scale-down picture of the web document is moved to a predetermined position on the screen of the main display 603 according to a user's selection.

Returning to FIG. 8, if the user wishes to delete the scale-down picture displayed on the scale-down picture window located on the screen of the main display 603, he or she re-presses the entire screen scale-down key. If the entire screen scale-down key is re-pressed (step 740), the scale-down picture window disappears (step 750).

Meanwhile, if a display time of a scale-down picture is set in advance or can be set by a user, the entire screen scale-down key need not be re-pressed. In this case, the scale-down picture of the entire document is displayed on the display screen for a predetermined time and then automatically deleted.

The main device and the sub-device according to the present invention can be integrally implemented or separately implemented in a computer system, a mobile telecommunication terminal, etc.

As described above, to display a web document of a frame structure on a screen of a mobile telecommunication device, the present invention can display only a frame selected by a user via a sub-device such as a remote control device on a screen of a home appliance which corresponds to the main device, thereby simplifying the access to a frame. In particular, it is more effective where a web document has a complicated frame structure or a screen of a main device is not so large.

Meanwhile, the present invention displays a web document and at the same time displays a scale-down picture of the entire web document, to thereby allow a user to see the entire structure of the web document easily.

As described above, the present invention has been described according to preferred embodiments. However, the present invention is not limited to the particularly preferred embodiments. It is apparent to one skilled in the art that there are many various modifications and variations without departing off from the spirit or the technical scope of the appended claims.

What is claimed is:

1. A web document display system, comprising:
   a web document retriever for retrieving a web document via a network;
   a main display for displaying the retrieved web document thereon;
   a scale-down picture generator for generating a scale-down picture obtained by scaling down the web document not more than a predetermined size;
   a sub-display for displaying the scale-down picture at the same time the retrieved document is displayed on the main display; and
   a frame structure determiner for grasping the frame structure of the retrieved web document, said frame structure including all frames present in the retrieved web document,
   wherein the frame structure of the web document is indicated on the scale-down picture.

2. The web document display system of claim 1, wherein said sub-display comprises a scale-down picture window which is formed on a portion of the main display.

3. The web document display system of claim 2, further comprising a scale-down picture selector for selecting a display or a non-display of the scale-down picture window.

4. The web document display system of claim 1, wherein said sub-display is operative in a non-display mode if a predetermined time elapses after the scale-down picture window is displayed.

5. The web document display system of claim 1, further comprising:
   a main device including the web document retriever and the main display attached thereto, and the frame structure determiner for grasping the frame structure of the retrieved web document;
   a sub-device including the scale-down picture generator and the sub-display attached thereto, and a user inputter; and
   a communicator for allowing the main device and the sub-device to communicate with each other, thereby providing information about the frame structure grasped by the frame structure determiner to the sub-device and transferring the frame select information inputted through the user inputter to the main device,
   wherein said sub-display displays the frame structure as provided, to thereby allow the user to select at least one of the frames through the user inputter, and said main display displays the selected at least one frame according to the frame select information.

6. The web document display system of claim 5, wherein said communicator is one of a wire or wireless communicator.

7. The web document display system of claim 5, wherein said sub-display is controlled so as to emphasize and display the frame currently selected by the user inputter.

8. The web document display system of claim 5, wherein when a plurality of frames are selected via the user inputter, the main display sequentially displays the selected frames at a predetermined interval of time.

9. The web document display system of claim 8, wherein an order in which the selected plurality of frames are sequentially displayed corresponds to an order in which a plurality of frame tags corresponding to the selected frames appears in the retrieved web document.

10. The web document display system of claim 5 wherein said communicator comprises a home appliance having a display function.

11. The web document display system of claim 5 wherein said communicator comprises a portable equipment selected from the group comprising a desktop computer, a laptop computer, a notebook computer, a mobile phone, a web video phone and PDAs/PCAs (Personal Digital/Communication Assistants).

12. The web document display system of claim 1, wherein said sub-display displays the frame structure, to thereby allow the user to select the frame through a user inputter, and said main display displays the selected frame according to the frame select information.

13. The web document display system of claim 1, wherein the frame determiner grasps the frame structure of the retrieved web document by evaluating a plurality of HTML tags present in the retrieved web document.

14. The web document display system of claim 1, wherein the frame determiner grasps the frame structure of the retrieved web document by determining whether at least one of a <FRAMESET> tag and a <FRAME> tag is present in the retrieved web document.

15. A web document display method, comprising the steps of:
    displaying a web document retrieved via a network;
    generating a scale-down picture obtained by scaling down the web document not more than a predetermined size; and
    displaying the scale-down picture at the same time the retrieved web document is displayed;
    wherein the scale-down picture generating step comprises the steps of storing the web document; grasping the frame structure of the web document, said frame structure including all frames present in the retrieved web document; and generating the frame structure into the scale-down picture, in which the retrieved web document is displayed on a predetermined main display.

16. The web document display method of claim 15, wherein the scale-down picture is indicated as a window which occupies a part of the screen on which the web document is displayed.

17. The web document display method of claim 16, further comprising the step of selecting a display or a non-display of the scale-down picture window.

18. The web document display method of claim 16, further comprising the step of performing a non-display of the scale-down picture if a predetermined time elapses after the scale-down picture window is displayed.

19. The web document display method of claim 15, wherein the retrieved web document is displayed on a predetermined main display, and the scale-down picture displaying step comprises the steps of transferring the scale-down picture to a remotely located sub-display; and displaying the scale-down picture on the sub-display.

20. The web document display method of claim 19, further comprising the steps of selecting at least one frame from the scale-down picture, and displaying the selected frame on the main display.

21. The web document display method of claim 15, wherein the scale-down picture displaying step comprises displaying the frame structure of the scale-down picture on a predetermined sub-display; selecting at least one frame from the scale picture; and displaying the selected frame on the main display.

* * * * *